UNITED STATES PATENT OFFICE.

JOHN BRENSIKE, OF HUSTISFORD, WISCONSIN.

PROCESS FOR CURDLING MILK.

1,083,659.  Specification of Letters Patent.  Patented Jan. 6, 1914.

No Drawing.  Application filed October 12, 1912.  Serial No. 725,474.

*To all whom it may concern:*

Be it known that I, JOHN BRENSIKE, a citizen of the United States, residing at Hustisford, in the county of Dodge and State of Wisconsin, have invented certain new and useful Improvements in Processes for Curdling Milk; and I do hereby declare the following to be a full, clear, and exact description of the invention, such as will enable others skilled in the art to which it appertains to make and use the same.

This invention relates to a process for curdling milk.

An object of the invention is to provide a new and comparatively inexpensive process for curdling milk, preparatory to converting the same into cheese, and the invention consists in such improved process as will be hereinafter fully described and afterward specifically claimed.

The rennet which is well known in the art, for curdling milk, is substituted in the present invention by a rennet prepared from the stomach and intestines of fishes of various kinds.

In carrying out my process I take a quantity of the stomachs and intestines of fish and after having removed the contents thereof I thoroughly dry the casing either by exposure to the atmosphere or in suitable drying machines. These dried materials are then placed in a vessel with sufficient water to cover or float them and are allowed to thus remain for several hours, or a sufficient time for them to become saturated and soft. I now surround the vessel containing this material with warm water and keep it in this condition for one or more hours, until the whole mass has become thoroughly warm. I then draw off the liquid and filter the same through any suitable filtering medium, the result being a fish extract or ferment ready for use. I may use this fish extract or ferment either as a substitute for the well known rennet, or I may use it in connection or combination therewith, a small quantity of the fish extract in the latter case being employed for the destruction of harmful bacteria in the liquid being treated. This fish extract or ferment has been found very effective, either alone or mixed with rennet, for all the purposes for which rennet has heretofore been used, my extract having been found to be a great destroyer of injurious or objectionable bacteria contained in the liquid being treated.

To curdle milk I mix a suitable quantity of my fish extract or rennet, either plain or mixed with rennet, as described, with milk whereupon the milk is curdled and freed from harmful bacteria.

What I claim as new is:

A process for curdling milk and destroying harmful bacteria therein consisting of drying a quantity of the stomachs and intestines of fish from which the contents have been removed, adding water sufficient to cover the mass and permitting it to stand until it has become thoroughly saturated and soft, subjecting the mass to a warm temperature for a period of one or more hours, then separating the liquid from the solid matter by filtering, then mixing the liquid with a suitable quantity of rennet, and finally applying the mixture to the milk.

In testimony whereof I have signed my name to this specification in the presence of two subscribing witnesses.

JOHN BRENSIKE.

Witnesses:
O. T. GOETSCH,
F. A. GOETSCH.